United States Patent [19]
Tüns et al.

[11] Patent Number: 4,729,471
[45] Date of Patent: Mar. 8, 1988

[54] CHAIN CONVEYOR FOR TRANSPORTING PACKAGING CONTAINERS

[75] Inventors: Heinz-Josef Tüns, Dachsen; Willi Altermatt, Neuhausen am Rheinfall, both of Switzerland

[73] Assignee: SIG Schweizerische Industrie-Gesellschaft, Neuhausen am Rheinfall, Switzerland

[21] Appl. No.: 377,048

[22] Filed: May 11, 1982

[30] Foreign Application Priority Data

May 12, 1981 [CH] Switzerland ............. 3080/81

[51] Int. Cl.$^4$ .............................. B65G 21/00
[52] U.S. Cl. ................. 198/860.3; 198/822
[58] Field of Search ............ 198/836, 838, 845, 861, 198/843, 822, 860.3

[56] References Cited

U.S. PATENT DOCUMENTS

| 1,769,992 | 9/1928 | Furbush ............. | 198/845 |
| 3,344,909 | 9/1965 | Hansen et al. ...... | 198/836 |
| 3,563,203 | 2/1971 | Stiltner ............. | 198/861 |
| 3,840,112 | 10/1974 | Hartwig ............. | 198/822 |
| 3,878,735 | 4/1975 | Preuss .............. | 198/838 |

FOREIGN PATENT DOCUMENTS

| 1170447 | 11/1969 | United Kingdom ........ | 198/838 |
| 1444379 | 7/1976 | United Kingdom . | |

Primary Examiner—L. J. Paperner
Assistant Examiner—D. Glenn Dayoan
Attorney, Agent, or Firm—Spencer & Frank

[57] ABSTRACT

A chain conveyor for conveying containers and composed of a chain extending over a closed conveyor path having straight and curved portions, the chain being composed of links and roller pins connecting the links together and extending transverse of the conveyor path, a chain protection box enclosing the chain and provided with rails for supporting the roller pins, the box and the rails presenting a lateral slit recess extending along the conveyor path alongside the chain and providing an enclosure for the chain which is sealed against dust except for the opening presented by the slit, connecting elements each forming part of a respective roller pin and extending out of the box through the recess for supporting holders for the containers, and a closed shielding belt formed of a succession of laminae each pivotally mounted on at least one respective roller pin and dimensioned and positioned such that the belt covers the slit recess over both the straight and curved portions of the conveyor path, each lamina covering the slit over at least approximately the distance between two successive roller pins and contacting the laminae adjacent thereto in the vicinity of the associated roller pins.

14 Claims, 9 Drawing Figures

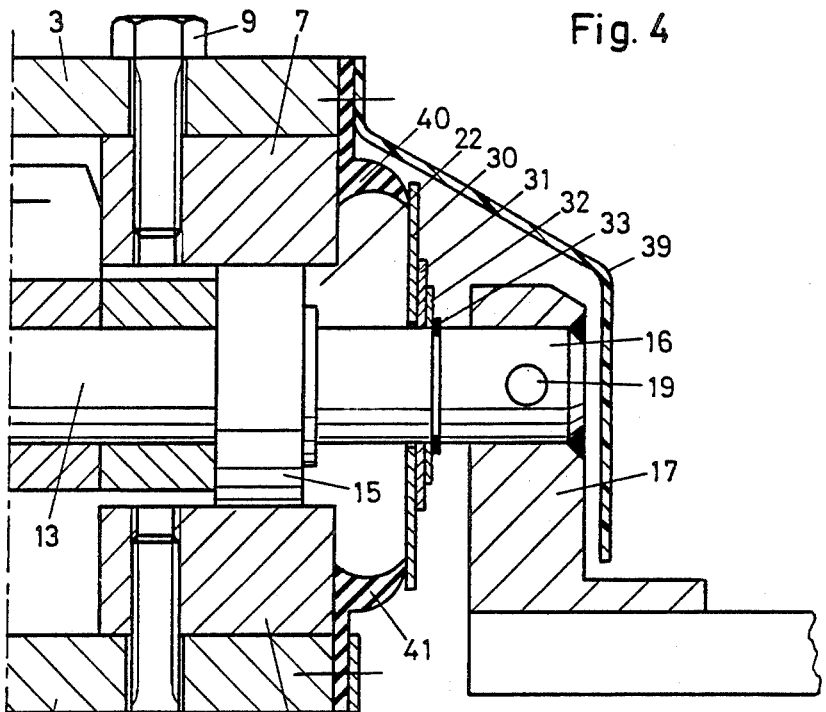
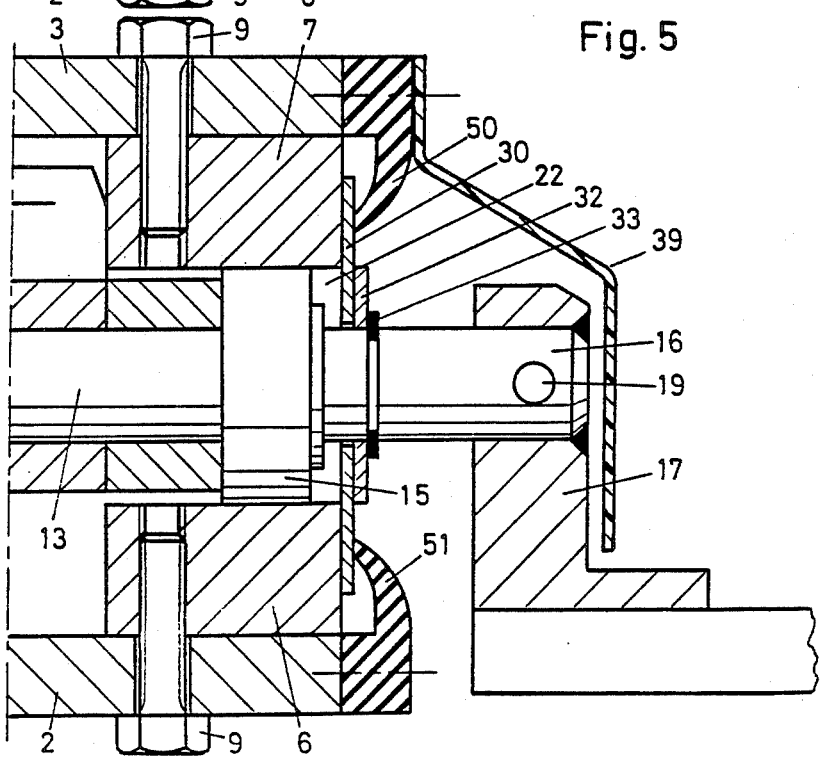

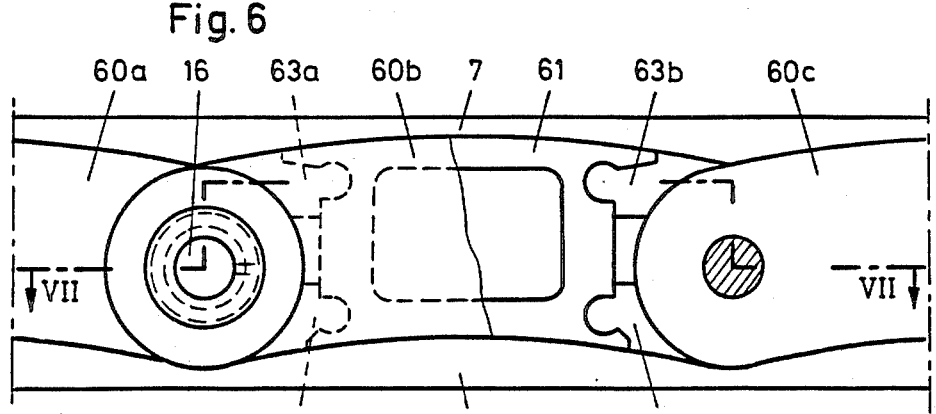
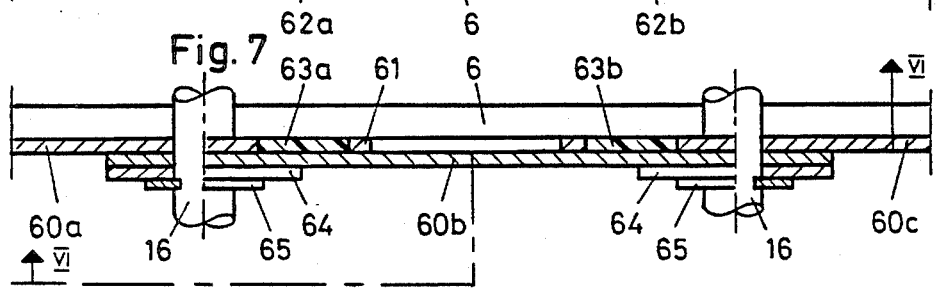
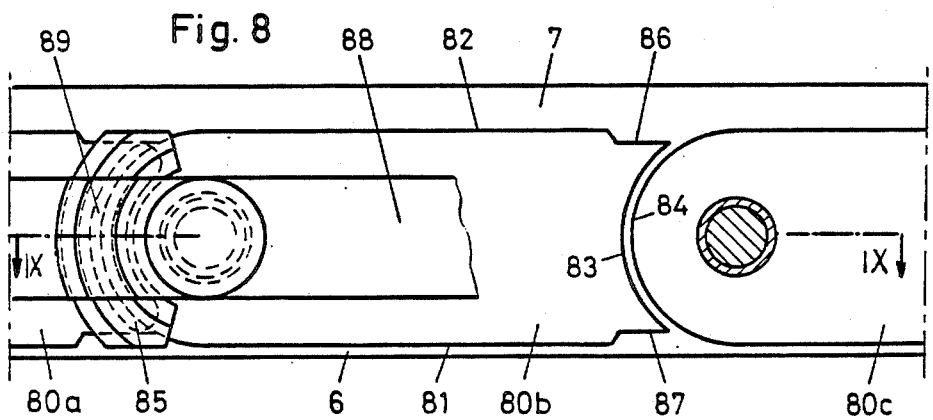
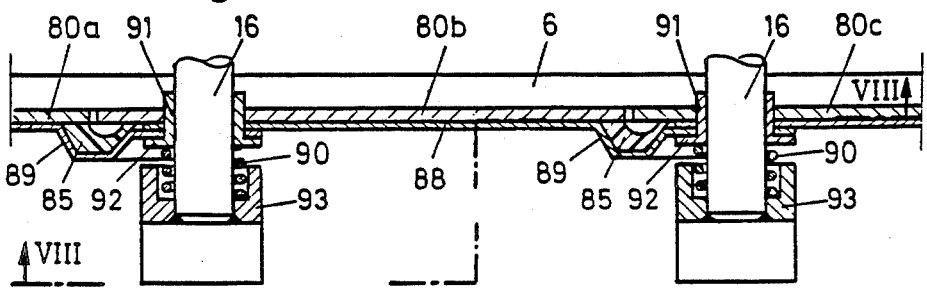

CHAIN CONVEYOR FOR TRANSPORTING PACKAGING CONTAINERS

BACKGROUND OF THE INVENTION

The present invention relates to a chain conveyor equipped with chain links moving in rails and with holders for conveying packaging containers, such as containers for pourable products.

German Gebrauchsmuster [Utility Mode Patent] No. 7,333,093 discloses a chain conveyor provided with covers to keep impurities from the rails and from the chain rollers. The chain conveyor and its mounts pass around associated drive wheels in a radial direction such that the holders lie on top of the chain conveyor when moving in the transporting direction and hang down during the return movement. The cover includes a shielding belt which is disposed between the supporting chain or chains and the holders and includes shielding members and sealing membranes disposed therebetween.

In addition to such chain conveyors in which the grippers or holders are in a so-called radial arrangement, there also exist chain conveyors in which the holders are moved on a path centered on a vertical plane alongside the chain or chains. Such chain conveyors then have their holders arranged in an axially parallel manner.

SUMMARY OF THE INVENTION

It is an object of the present invention to provide, in a chain conveyor with an axially parallel arrangement of the holders, a cover preventing penetration of the product to be packaged and/or dust into the guide elements and into the coupling points between the chain links.

The above and other objects are achieved, according to the invention, by the provision of a chain conveyor for conveying containers comprising:

a chain extending over a closed conveyor path having straight and curved portions, the chain being composed of links and roller pins connecting the links together and extending transverse of the conveyor path;

a chain protection box enclosing the chain and provided with rails for supporting the roller pins, the box and rails presenting a lateral slit recess extending along the conveyor path alongside the chain and providing an enclosure for the chain which is sealed against dust except for the opening presented by the slit;

connecting elements each forming part of a respective roller pin and extending out of the box through the recess for supporting holders for the containers; and means defining a closed shielding belt formed of a succession of laminae each pivotally mounted on at least one respective roller pin and dimensioned and positioned such that the belt covers the slit recess over both the straight and curved portions of the conveyor path, each lamina covering the slit over at least approximately the distance between two successive roller pins and contacting the laminae adjacent thereto in the vicinity of the associated roller pins.

Embodiments of the invention will now be explained in greater detail with the aid of the drawing.

BRIEF DESCRIPTION OF THE DRAWING

FIG. 4 is a view similar to that of FIG. 1, and to an enlarged scale, of part of a chain link with a cover arrangement according to a second embodiment of the invention.

FIG. 5 is a view similar to that of FIG. 4 showing a third embodiment of a cover arrangement according to the invention.

FIG. 6 is a view similar to that of FIG. 2 of a fourth embodiment of a cover arrangement according to the invention.

FIG. 7 is a cross-sectional view of the cover arrangement of FIG. 6 along the line VII—VII of FIG. 6.

FIG. 8 is a view similar to that of FIG. 6 of a fifth embodiment of a cover arrangement according to the invention.

FIG. 9 is a cross-sectional view of the embodiment of FIG. 8 along the line IX—IX of FIG. 8.

DESCRIPTION OF THE PREFERRED EMBODIMENTS

Figure 1:
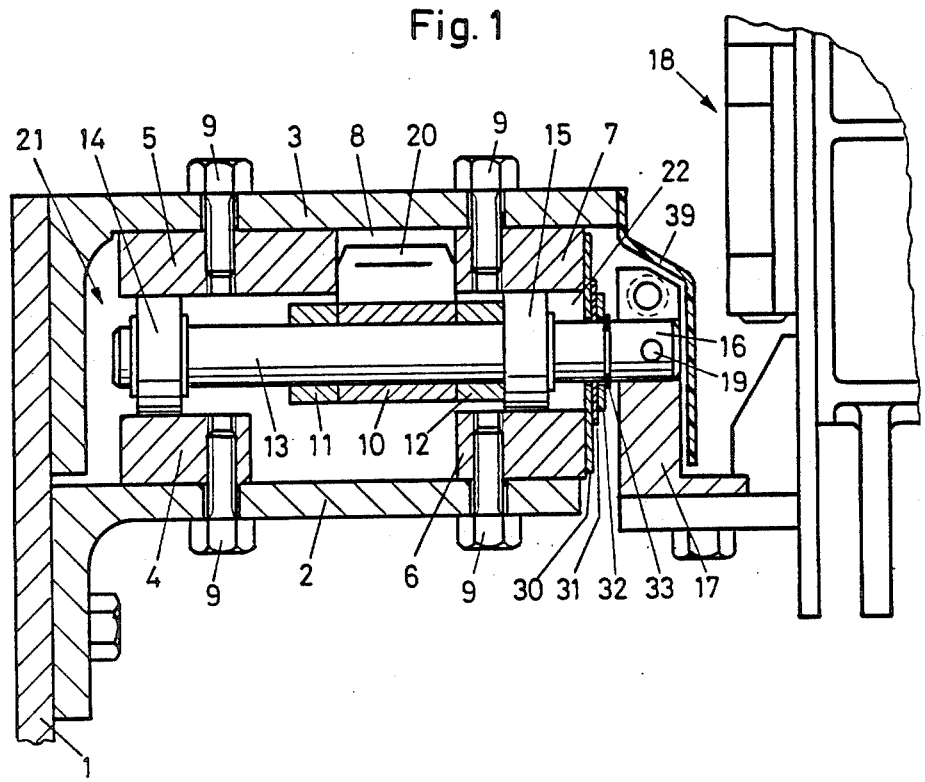
FIG. 1 is an elevational, cross-sectional view of a chain link with guide rails, guide rollers, chain protection box and holder, according to a preferred embodiment of the invention.

FIG. 1 shows a chain protection box 21 defined by a lower cover 2 and an upper cover 3 fastened to a stationary support 1 on a machine stand. Pairs of rails 4, 5 and 6, 7 are fastened to the covers 2 and 3 by means of screws 9. A roller chain composed of links which include fork arms composed, on the one hand, of a rod-shaped arm section 10 and, on the other hand, of two fork tines 11 and 12, is disposed within box 21. The rod-shaped arm sections 10 and the fork tines 11 and 12 are articulated to one another by means of chain roller pins 13. Each chain roller pin 13 supports two rollers 14 and 15 each at a respective pin end.

Between the upper rails 5 and 7 there is a space 8 in which engage guide tongues 20 of the chain links to effect lateral guidance of the chain. Each tongue 20 may be designed in the form of a prong including a further guide roller. In the present illustration, the precise mutual relationship between the individual elements is not shown nor are the free spaces between each roller and one associated rail since these are features which are generally known in the conveying art and are of no significance for the present invention.

The two guide rails 6 and 7 at the outer edge of the chain protection housing 21 close that edge of the housing except for a slit recess 22. Connection elements 16 in the form of extensions of the chain roller pins 13 pass laterally out of the housing through these slit recesses 22 so that a carrier 17 for a holder 18 can be directly fastened to each chain roller pin 13 by means of a connecting pin 19. An apron 39, for example a Z-shaped angled sheet metal strip or plastic band, covers the slit recess 22 of the chain protection box 21 and protects its interior against material that might trickle down from the containers. As a protection for the interior of housing 21 against dust particles, laminae, i.e. thin plates or strips, 30 are connected in an articulated manner to the chain roller pins 13.

Figure 2:
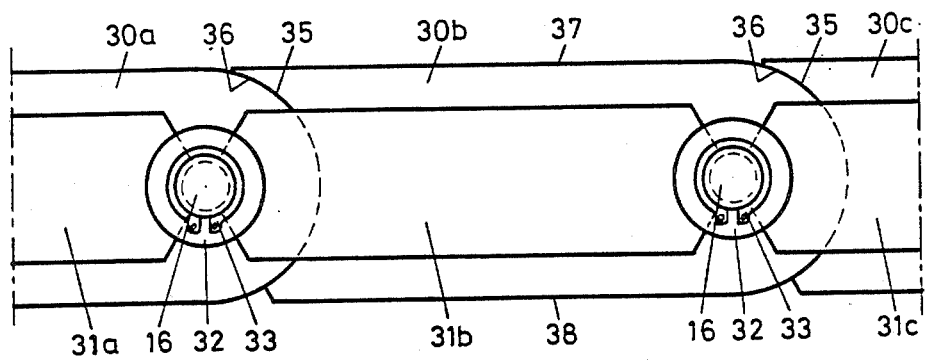
FIG. 2 is a side detail view of the cover arrangement of FIG. 1 over the slit recess in the chain protection box.
Figure 3:
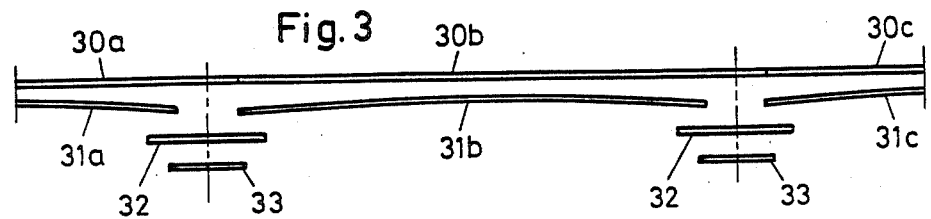
FIG. 3 is an exploded edge view of elements of the cover arrangement of FIG. 2.

The laminae 30 according to a first embodiment are clearly shown in FIGS. 2 and 3. FIG. 2 shows a series of these laminae 30a, 30b and 30c each made of a strip of material having parallel, straight longitudinally extending edges 37 and 38 and terminated at one end by a concavely curved edge 35 and at its other end by a convexly curved edge 36. Each edge 35 and 36 has a circular curvature and all such edges have the same radius of curvature. Each lamina 30 has a bore in the region of its end adjacent the convexly curved edge 36 through which passes the extension 16 of a respective chain roller pin 13. The width of each lamina 30, i.e. the distance between edges 37 and 38, is dimensioned such that the slit recess 22 is fully covered along the straight portions of the chain conveyor path as well as along its curved portions. The length of each lamina 30, between edges 35 and 36, is dimensioned such that each circularly convex edge 36 comes to mate with the circularly concave edge 35 of the respective adjacent lamina so that the two adjacent laminae 30a and 30b or 30b and 30c contact one another along these edges 35, 36. In the curved parts of the conveyor path, mating edges 35 and 36 slide along one another while remaining in contact.

With such laminae 30, the opening in the chain protection housing 21, formed by the slit recess 22, is closed so that only narrow slits remain between the laminae 30 and the rails 6 and 7, on the one hand, and between the circular edges 35 and 36 of the laminae 30, on the other hand.

To press the laminae 30a, 30b and 30c against the rails 6 and 7, leaf springs 31a, 31b and 31c are provided and are given a slight initial curvature, as shown in FIG. 3, to exert a pressing force on the laminae. Each leaf spring 31a, 31b and 31c is provided at each end, with a circularly concave recess dimensioned to fit around a portion of an associated extension 16. Each end of each leaf spring has portions which slope away from the associated recess so that adjacent leaf spring ends do not interfere with one another on the curved portions of the conveyor path.

Outside of the leaf springs 31a, 31b, 31c, etc., supporting discs, or washers, 32 and retaining rings 33 are placed onto the chain roller pins 20 as to, on the one hand, cover the gap between two adjacent leaf springs 31a, 31b or 31b, 31c and on the other hand, press the laterally projecting end sections of the curved leaf springs against the laminae so that the gaps between adjacent laminae are covered as well by the leaf springs.

According to a further feature of this first embodiment, pairs of sealing lips 40 and 41 or 50 and 51, as shown in FIGS. 4 and 5, respectively, may be provided to both sides of the slit recess 22 to aid in covering the gap between the laminae 30 and the rails 6, 7.

In the embodiment of FIG. 4, the sealing lips 40 and 41 are positioned between the rails 6 and 7 and the laminae 30. In this case, leaf springs 31, supporting discs 32 and retaining rings 33 are also required to press the laminae 30 against the sealing lips 40 and 41.

In the embodiment of FIG. 5 the sealing lips 50 and 51 cover the gaps between the laminae 30 and the rails 6 and 7 from the outside. Due to the fact that the laminae 30 are pressed by the sealing lips 50 and 51 onto the rails 6 and 7, the leaf springs 31 of the preceding embodiments are not required.

According to a further embodiment shown in FIGS. 6 and 7, laminae 60a, 60b and 60c are curved, so that their longitudinally extending edges are arcuate, in such a manner that even if the laminae are narrowed, sufficient covering of the slit recess between the rails 6 and 7 is still assured in the curved sections of the conveyor. The arrangement of this embodiment results in part in a two-layer covering of the slit recess. The laminae 60a, 60b and 60c are each axially symmetrical with respect to an axis midway between, and perpendicular to, the associated pins 13 so that both axial ends of each laminae are convexly arcuate and each end is provided with a bore through which an associated extension 16 projects. Thus, two adjacent chain roller pins 13 or the associated extensions 16 each engage in a respective one of two bores of each laminae and every other lamina, e.g. the center lamina 60b covers the two adjacent laminae 60a and 60c in the region of the chain roller pins.

This requires that lamina 60b be laterally offset from laminae 60a and 60c. Under each center lamina such as 60b, there is an inserted lamina 61 having four sealing inserts 62a, 62b and 63a, 63b made of a plastic having a low coefficient of friction. Lamina 61 and inserts 62 and 63 are positioned and dimensioned so that the gap between each lamina 60a or 60c and the inserted lamina 61 is kept as small as possible and these gaps are additionally covered by the center lamina 60b. Each lamina 61 and its inserts 62, 63 present concave ends which mate with the convex ends of laminae 60a and 60c and help to hold lamina 61 in position.

In order to generate a compression pressure for pressing the two laminae 60a and 60c and the inserted lamina 61 against the rails 6 and 7, the center lamina 61b could be designed as a leaf spring, similar to springs 31, shown in FIGS. 1–3, and the laminae can be fastened by means of supporting discs 64 and retaining rings 65. On the other hand, it would also be possible to provide pressure by means of sealing lips as shown in FIG. 5. In FIG. 6, extension 16, disc 64 and ring 65 are omitted from the right-hand side.

FIGS. 8 and 9 show a last embodiment. Here, laminae 80a, 80b and 80c are shaped in a manner similar to the first embodiment shown in FIGS. 1 through 3, i.e. each lamina has two parallel longitudinally extending sides 81 and 82, one concavely curved end 83 and one convexly curved end 84. The gap between two adjacent laminae is covered by a curved sealing lip 85 whose ends engage two lateral recesses 86 and 87 adjacent the concavely curved end 83 of one associated lamina. Each lip 85 is pressed down by a covering lamina 88 and a form-locking mount 89 for the sealing lip 85 onto the two adjacent laminae 80a and 80b or 80b and 80c. Mount 89 may be integral with its lamina 88.

The laminae 80 may also be pressed to the rails 6 and 7 by leaf springs of the above-mentioned type. A further way of producing the compression pressure is by the provision of helical springs 90, each of which is pressed between a sleeve 91 fitted around an associated extension 16 and provided with a pressing flange 92 and a cap 93 which is fastened to the extension 16 by a solder connection, a screw connection or simply by means of a transverse connecting pin.

The laminae 30, 60, 80 can be made from steel, bronze or like materials of 1–3 mm thickness. The sealing lips 40, 41, 50, 51 are preferably made from a rubber elastic material.

It will be understood that the above description of the present invention is susceptible to various modifications, changes and adaptations and the same are intended to be comprehended within the meaning and range of equivalents of the appended claims.

What is claimed is:

1. A chain conveyor for conveying containers comprising:
a chain extending over a closed conveyor path having straight and curved portions, said chain being composed of links and roller pins connecting said links together and extending transverse of the conveyor path;

a chain protection box enclosing said chain and provided with rails for supporting said roller pins, said box and said rails presenting a lateral slit recess extending along said conveyor path alongside said chain and providing an enclosure for said chain which is sealed against dust except for the opening presented by said slit;

connecting elements each forming part of a respective roller pin and extending out of said box through said recess for supporting holders for the containers; and means defining a closed shielding belt formed of a succession of laminae each pivotally mounted on one respective roller pin and dimensioned and positioned such that said belt covers said slit recess over both the straight and curved portions of said conveyor path, each said lamina covering said slit over at least approximately the distance between two successive roller pins and contacting said laminae adjacent thereto in the vicinity of the associated roller pins, each lamina being substantially coextensive in length with a respective link;

wherein said laminae are constituted by sheet metal strips each having two opposed ends, one end having a convex circular outline and the other end having a concave circular outline with a radius of curvature approximately the same as that of said convex circular outline, each said strip being pivotally mounted on a respective roller pin at said one end having a convex circular outline; and wherein said means defining a shielding belt comprise spring elements mounted to press said laminae against portions of said chain protection box adjacent to both sides of said slit recess.

2. Conveyor as defined in claim 1 wherein the longitudinal edges of each said strip have the form of at least approximately parallel, straight lines.

3. Conveyor as defined in claim 1 wherein the longitudinal edges of each said strip have the form of at least approximately parallel curved lines.

4. Conveyor as defined in claim 1 wherein said spring elements comprise leaf springs, and said means defining a shielding belt further comprise washers placed onto said chain roller pins to cover the ends of adjacent leaf springs, and securing means fastening said washers to said chain roller pins.

5. Conveyor as defined in claim 1 wherein each said lamina is pivotally mounted, at one end, on only one said roller pin, and each said lamina comprises a sealing lip disposed at its other end and covering the interstice between said other end and the lamina adjacent thereto.

6. Conveyor as defined in claim 5 wherein each said lamina is provided, in the region of its one end, with an opening through which passes the said roller pin on which said lamine is pivotally mounted, and said means defining a shielding belt further comprise: a plurality of sleeves each placed onto a respective roller pin and each having an annular flange which covers the opening in said lamina which is mounted on said respective roller pin; and a plurality of further sleeves each fastened to a respective roller pin, and wherein said spring elements comprise a plurality of compression springs each associated with a respective roller pin and each pressed by said further sleeve fastened to its respective roller pin against said laminae adjacent its respective roller pin for pressing said laminae against said chain protection box.

7. Conveyor as defined in claim 1 further comprising sealing lips fastened to said chain protection box at both sides of said slit recess for effecting a seal between said laminae and said chain protection box.

8. Conveyor as defined in claim 7 wherein said sealing lips cover the longitudinal sides of said laminae and simultaneously press them against said chain protection box.

9. Conveyor as defined in claim 8 wherein said means defining a shielding belt further comprise: a plurality of washers each pressing a respective lamina against said chain protection box; and a plurality of retaining rings each pressing a respective washer against its associated lamina.

10. Conveyor as defined in claim 7 wherein said sealing lips are interposed between said chain protection box and said laminae, and said means defining a shielding belt further comprise a plurality of washers disposed for pressing said spring elements toward said chain protection box so as to press said laminae onto said sealing lips, and a plurality of retaining rings holding said washers in position.

11. Conveyor as defined in claim 1 further comprising an apron disposed outside of said connection elements between said chain roller pins and the holders for covering said slit recess and said shielding belt from the top and in the region between the holders and said shielding belt.

12. Conveyor as defined in claim 1 wherein said laminae are dimensioned such that said one end of each said lamina mates with, and contacts, said other end of the respectively adjacent lamina.

13. A chain conveyor for conveying containers comprising:

a chain extending over a closed conveyor path having straight and curved portions, said chain being composed of links and roller pins connecting said links together and extending transverse of the conveyor path;

a chain protection box enclosing said chain and provided with rails for supporting said roller pins, said box and said rails presenting a lateral slit recess extending along said conveyor path alongside said chain and providing an enclosure for said chain which is sealed against dust except for the opening presented by said slit;

connecting elements each forming part of a respective roller pin and extending out of said box through said recess for supporting holders for the containers; and means defining a closed shielding belt formed of a succession of laminae each pivotally mounted on two adjacent pins and dimensioned and positioned such that said belt covers said slit recess over both the straight and curved portions of said conveyor path, each said lamina covering said slit over at least approximately the distance between two successive roller pins and contacting said laminae adjacent thereto in the vicinity of the associated roller pins, wherein each said lamina is substantially coextensive in length with a respective link, and is pivotally mounted on two adjacent chain roller pins and has a convex circular outline at each of its ends, and said means defining a shielding belt comprise a plurality of intermediate members each associated with a respective one of every alternate lamina and each having a concave circular outline at each end via which it contacts the circular outline at the adjacent end of a respective lamina adjacent said lamina which is associated with said intermediate member.

14. Conveyor as defined in claim 13 wherein each said intermediate member comprises inserts at both ends thereof via which each said member contacts said outlines at said adjacent ends of said respective laminae to form a dust-tight connection therewith.

* * * * *